United States Patent
Dong

(10) Patent No.: US 12,177,764 B2
(45) Date of Patent: Dec. 24, 2024

(54) METHOD AND APPARATUS FOR PROCESSING BASIC SERVICE SET IDENTIFIER, AND COMPUTER STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/767,835

(22) PCT Filed: Oct. 11, 2019

(86) PCT No.: PCT/CN2019/110632
§ 371 (c)(1),
(2) Date: Apr. 8, 2022

(87) PCT Pub. No.: WO2021/068204
PCT Pub. Date: Apr. 15, 2021

(65) Prior Publication Data
US 2024/0089827 A1    Mar. 14, 2024

(51) Int. Cl.
*H04W 4/00*   (2018.01)
*H04W 48/08*  (2009.01)
*H04W 52/02*  (2009.01)
*H04W 84/12*  (2009.01)

(52) U.S. Cl.
CPC ....... *H04W 48/08* (2013.01); *H04W 52/0212* (2013.01); *H04W 84/12* (2013.01)

(58) Field of Classification Search
CPC . H04W 48/08; H04W 52/0212; H04W 84/12; H04W 48/12
USPC .......................................... 370/311
See application file for complete search history.

(56) References Cited

U.S. PATENT DOCUMENTS

| | | | |
|---|---|---|---|
| 2009/0323608 A1 | 12/2009 | Adachi et al. | |
| 2019/0021106 A1 | 1/2019 | Oteri et al. | |
| 2019/0124660 A1* | 4/2019 | Huang | H04W 76/14 |
| 2019/0268892 A1 | 8/2019 | Gidvani et al. | |
| 2019/0268956 A1 | 8/2019 | Xiao et al. | |
| 2020/0037325 A1* | 1/2020 | Chu | H04W 24/02 |
| 2020/0221378 A1* | 7/2020 | Kneckt | H04W 48/14 |
| 2021/0076437 A1* | 3/2021 | Kneckt | H04W 76/11 |

(Continued)

FOREIGN PATENT DOCUMENTS

CN   103561449 A   3/2017

OTHER PUBLICATIONS

Chinese Patent Application No. 201980002376.7, Office Action dated May 25, 2022, 6 pages.

(Continued)

*Primary Examiner* — Chuong T Ho
(74) *Attorney, Agent, or Firm* — Cozen O'Connor

(57) ABSTRACT

A method for processing a basic service set identifier (BSSID) includes: generating a message frame, in which the message frame includes information bits for BSSIDs under more than one frequency bands, and the more than one frequency bands include a first frequency band for sending the message frame; and sending the message frame using the first frequency band. An apparatus and computer storage medium for processing a BSSID are also disclosed.

18 Claims, 5 Drawing Sheets

(56) References Cited

U.S. PATENT DOCUMENTS

2021/0227547 A1* 7/2021 Chitrakar .............. H04L 5/0091
2021/0392705 A1* 12/2021 Jeong ................... H04W 76/12

OTHER PUBLICATIONS

Chinese Patent Application No. 201980002376.7, English translation of Office Action dated May 25, 2022, 8 pages.
European Patent Application No. 19948600.2, Search and Opinion dated May 23, 2023, 11 pages.
PCT/CN2019/110632 International Search Report, dated Jul. 16, 2020 2 pages.

* cited by examiner generating a message frame, in which the message frame includes information bits for BSSIDs under a plurality of frequency bands, and the plurality of frequency bands include a first frequency band for sending the message frame — S11 sending the message frame using the first frequency band — S12

| Information Element ID | Length | Self BSS-color | Other BSS-color | ...... |
|---|---|---|---|---|
| 1 octet | 1 octet | 1 octet | 1 octet | 1 octet |

| Identification of the second frequency band (Band info) | BSSID of the second frequency band (BSS color) |
|---|---|
| 2 Bits | 6bits |

METHOD AND APPARATUS FOR PROCESSING BASIC SERVICE SET IDENTIFIER, AND COMPUTER STORAGE MEDIUM

CROSS-REFERENCE TO RELATED APPLICATION

This application is a U.S. National Stage of International Application No. PCT/CN2019/110632, filed on Oct. 11, 2019, the entire content of which is incorporated herein by reference for all purposes.

TECHNICAL FIELD

The disclosure relates to a field of communication technologies, and particularly to a method for processing a basic service set identifier (BSSID), and an apparatus for processing a basic service set identifier (BSSID), and a computer storage medium.

BACKGROUND

A study group (SG) based on an IEEE wireless LAN standard (IEEE 802.11) has been created to study a next generation of WLAN standard (IEEE 802.11be). The study scope includes a bandwidth transmission of 320 MHz, an aggregation and cooperation of a plurality of frequency bands. The aggregation and cooperation of the plurality of frequency bands refers to devices perform a communication simultaneously under frequency bands of 2.4 GHz, 5.8 GHz, 6 GHz and so on. In an existing standard, in order to save power of the device, a basic service set (BSS) coloring technology is used by the device to quickly identify a data frame of BSS in the prior art. However, this way is merely used for the data frame in a single connection (one frequency band). For the data frame sent through a multi-connection in the IEEE 802.11be, it is required to enhance the existing BSS coloring technology to apply the BSS coloring technology to the data frame in the multi-connection.

SUMMARY

The disclosure provides a method for processing a basic service set identifier (BSSID), an apparatus processing a basic service set identifier (BSSID) and a computer storage medium.

According to a first aspect of embodiments of the disclosure, a method for processing a basic service set identifier (BSSID) is provided. The method includes: generating a message frame, in which the message frame includes information bits for BSSIDs (such as BSS colors) under a plurality of frequency bands, and the plurality of frequency bands include a first frequency band for sending the message frame; and sending the message frame using the first frequency band.

According to a second aspect of the embodiments of the disclosure, a method for processing a basic service set identifier (BSSID) is provided. The method includes: receiving a message frame; and determining BSSIDs for a plurality of frequency bands based on the message frame, in which the plurality of frequency bands includes a first frequency band for sending the message frame.

According to a third aspect of the embodiments of the disclosure, a device for processing a basic service set identifier (BSSID) is provided. The device includes: a processor and a memory storing instructions executable by the processor. The processor is configured to perform the method for processing a basic service set identifier (BSSID) according to any of technical solutions applied at an access point (AP) side.

According to a fourth aspect of the embodiments of the disclosure, a device for processing a basic service set identifier (BSSID) is provided. The device includes: a processor and a memory storing instructions executable by the processor. The processor is configured to perform the method for processing a basic service set identifier (BSSID) according to any of technical solutions applied at a station (STA) side.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figures 1, 2:
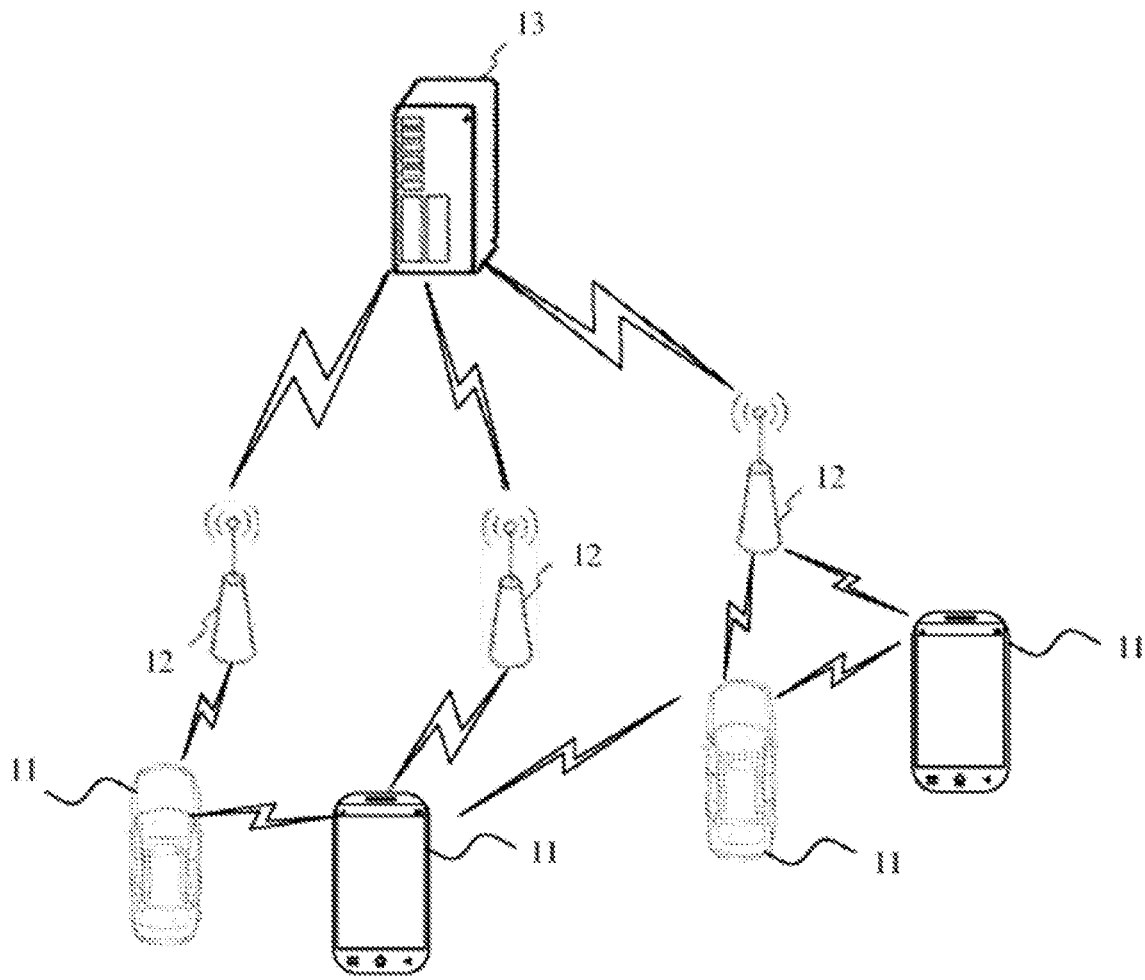
FIG. 1 is a schematic diagram illustrating a wireless communication system according to an embodiment.
FIG. 2 is a first flowchart illustrating a method for processing a basic service set identifier (BSSID) according to an embodiment.

With reference to FIG. 1, FIG. 1 is a schematic diagram illustrating a wireless communication system according to an embodiment. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. Alternatively, the wireless communication system may also be a 5G system, also known as the new radio (NR) system. Alternatively, the wireless communication system may also be a next-generation system of the 5G system. An access network in the 5G system may be called as a new generation radio access network (NG-RAN), or a machine-type communication system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it generally includes a central unit (CU) and at least two distributed units (DUs). The CU is provided with a protocol stack including a packet data convergence protocol (PDCP) layer, a radio link control (RLC), and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

In the related art, a study group (SG) is founded based on an IEEE wireless LAN standard (IEEE 802.11) to study a next generation of WLAN standard (IEEE 802.11be). The study scope includes a bandwidth transmission of 320 MHz, an aggregation and cooperation of a plurality of frequency bands. A proposed vision is to improve a rate and throughout by at least four times compared to the existing 802.11ax. An application scenario includes but is not limited to a video transmission, an augmented reality (AR) transmission, a virtual reality (VR) transmission and so on.

The aggregation and cooperation of the plurality of frequency bands refers to that devices perform a communication simultaneously under frequency bands of 2.4 GHz, 5.8 GHz, 6 GHz and so on. A new media access control (MAC) mechanism is required to manage the communication performed between the devices simultaneously under a plurality of frequency bands.

During a standard setting process, a data frame transmission in a multi-link (ML) and multi-connection is discussed. For example, upper layer data at the same priority is transmitted simultaneously within different bandwidths of the frequency bands of 2.4 GHz, 5.8 GHz, 6 GHz or the same frequency band.

In the existing standard, in order to enable the device to quickly identify a presentation protocol data unit (PPDU) sent by a basis service set (BSS) with less power, a BSSID (such as BSS color) is carried in the data frame, typically located in a physical header.

However, a BSS color value in the existing standard is merely used for the data frame in a single connection, but data is transmitted through a multi-connection in the 802.11be. For the data transmission in the multi-connection, there is not feasible solution about how to select the BSS color value.

Based on the above mentioned wireless communication system, various embodiments of the inventive method are provided to decrease a power consumption of the device for the data transmission in the multi-connection.

FIG. 2 is a first flowchart illustrating a method for processing a BSSID according to an embodiment. As illustrated in FIG. 2, the method is applied in an access point device, and includes the following.

At block S11, a message frame is generated. The message frame includes information bits for BSSIDs (such as BSS colors) under a plurality of frequency bands. The plurality of frequency bands includes a first frequency band for sending the message frame.

The BSSID may be a BSS color.

The message frame may include but be not limited to a beacon frame, a probe response frame, an association response frame.

Here, the plurality of frequency bands at least includes a first frequency band and a second frequency band. The second frequency band is a communication frequency band different from the first frequency band.

In order to enable the device to quickly identify whether the sent PPDU belongs to a PPDU of the associated BSS or a PPDU of another BSS, the frequency color has a one-to-one correspondence with the BSS color. In other words, different BSS colors correspond to different frequency bands, and different BSSs are generated. For the same frequency band, the same BSS color value is set. For different frequency bands, the BSS color values under different frequency bands are set to be different. For example, frequency bands of a multi-communication connection include 2.4 GHz and 5 GHz. The BSS color corresponding to the frequency band of 2.4 GHz is different from the BSS color corresponding to the frequency band of 5 GHz.

It should be noted that, for the same frequency band, if the multi-connection is performed in a plurality of bandwidths of the same frequency band (with no overlapped frequency spectrum), the same BSS color value or different BSS color values can be set, which can be determined based on a communication environment of the plurality of bandwidths.

In some embodiments, the information bits of the message frame at least include a first information bit and a second information bit. In detail, the first information bit of the information bits of the message frame carries a BSSID indicating the first frequency band. The second information bit of the information bits of the message frame carries a BSSID indicating the second frequency band.

In this way, by carrying the BSSIDs corresponding to different communication frequency bands at different positions of the information bits, a message frame receiving end (such as a station device) parses the BSSIDs from the information bits to obtain the BSSIDs corresponding to different frequency bands.

Figures 3, 4, 5:
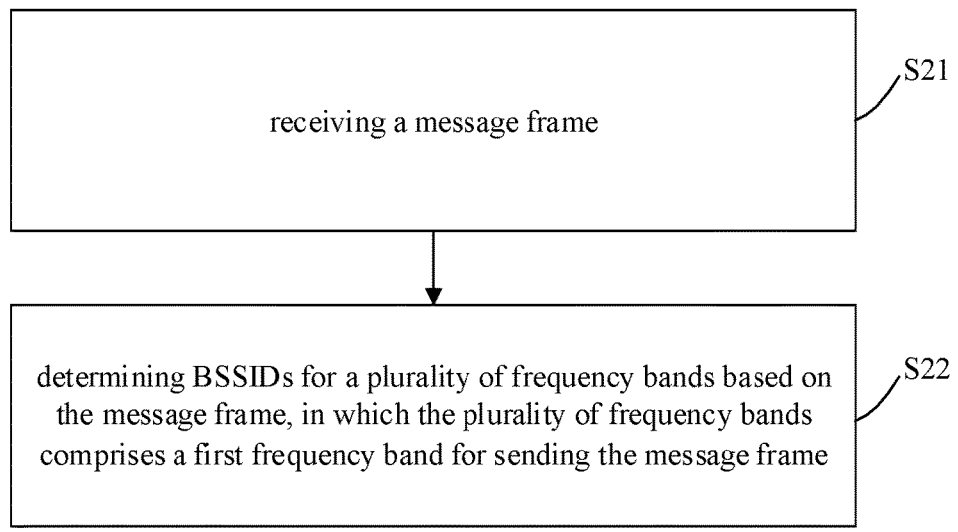
FIG. 3 is a schematic diagram illustrating a message frame according to an embodiment.
FIG. 4 is a schematic diagram illustrating a second information bit of the message frame according to an embodiment.
FIG. 5 is a second flowchart illustrating a method for processing a BSSID according to an embodiment.

FIG. 3 is a schematic diagram illustrating a message frame according to an embodiment. It can be seen from FIG. 3 that, the message frame includes an information element identification (Information Element ID), a length, a BSSID (which can be referred to as Self BSS color) under the first frequency band, a BSSID (which can be referred to as Other BSS color) under the second frequency band or other information.

FIG. 4 is a schematic diagram illustrating a second information bit of the message frame according to an embodiment. As illustrated in FIG. 4, the second information bit carries an identification (such as Band info) of the second frequency band and a BSSID (such as BSS color) of the second frequency band.

At block S12, the message frame is sent using the first frequency band.

In this way, since the message frame includes the information bits for the BSSIDs under the plurality of frequency bands, when data is transmitted in a multi-communication connection, the station device may quickly identify the data sent by the corresponding AP device based on the BSSIDs of the frequency bands carried in the information bits for the BSSIDs, such that a power of the station device can be saved.

In some implementations, the method further includes setting on a physical header of the message frame a BSSID that is the same as the BSSID indicating the first frequency band in the first information bit.

In this way, the message frame receiving end may quickly identify the communication frequency band of sending the message frame based on the BSSID on the physical header of the message frame.

In some implementations, the method further includes carrying duration information of the BSSID of each frequency band of the plurality of frequency bands in the message frame.

In this way, since the message frame further carries duration information of the BSS color values corresponding to respective frequency bands, the station may clearly obtain a time point of changing the BSS color value next time after receiving the BSS color value.

In some implementations, the method further includes using a same BSSID by communication connections in a multi-communication connection in response to the multi-communication connection being a multi-communication connection within the first frequency band; and using respective BSSIDs suitable for communication frequency bands by the communication connections in the multi-communication connection in response to the multi-communication connection including a communication connection within the first frequency band and a communication connection within the second frequency band. Different BSSIDs are used for different frequency bands. In this way, since different frequency bands have different BSSIDs, the message frame receiving end (for example the station device) may obtain the BSSIDs corresponding to different frequency bands, such that the station device may identify whether the data is sent by the associated BSS more quickly, thus decreasing a power consumption of the station device for the data transmission in the multi-communication connection.

According to the technical solution of the embodiments of the disclosure, the message frame generated by the AP device includes the information bits for the BSSIDs under the plurality of frequency bands, such that when the data is transmitted in the multi-communication connection, the station device may quickly identify the data sent by the corresponding AP device based on the BSSIDs of the frequency bands carried in the information bits for the BSSIDs, thus saving a power of the station device.

FIG. 5 is a second flowchart illustrating a method for processing a BSSID according to an embodiment. As illustrated in FIG. 5, the method is applied in a station device and includes the following.

At block S21, a message frame is received.

The message frame may include but be not limited to a beacon frame, a probe response frame, an association response frame.

At block S22, BSSIDs for a plurality of frequency bands are determined based on the message frame. The plurality of frequency bands includes a first frequency band for sending the message frame.

The plurality of frequency bands at least includes a first frequency band and a second frequency band. The second frequency band is a communication frequency band different from the first frequency band.

In this way, the station device may quickly identify the data sent by the corresponding AP device based on the BSSIDs of the frequency bands, thus saving a power of the station device.

In the above technical solution, the method further includes setting BSSIDs respectively corresponding to frequency bands in a multi-communication connection on a physical header of a data frame sent through the multi-communication connection.

In this way, the data frame receiving end may quickly identify the communication frequency band of sending the data frame based on the BSSIDs on the physical header of the data frame.

In the above technical solution, the method further includes determining a duration of the BSSID of each frequency band based on the message frame, in response to the message frame carrying duration information of the BSSID of each frequency band of the plurality of frequency bands.

In this way, the station may clearly obtain a time point of changing the BSS color value next time after receiving the message frame.

In the above technical solution, the method further includes updating the BSSID of each frequency band based on the duration of the BS SID of each frequency band.

In this way, the station may update the BSSID of each frequency band based on the duration information, thus facilitating quick recognition of the communication frequency band for data transmission in the multi-communication connection.

In the above technical solution, the method further includes using a same BSSID by communication connections in a multi-communication connection in response to the multi-communication connection being a multi-communication connection within the first frequency band; and using respective BSSIDs suitable for communication frequency bands by the communication connections in the multi-communication connection in response to the multi-communication connection including a communication connection within the first frequency band and a communication connection within the second frequency band, in which different BSSIDs are used for different frequency bands.

In this way, since different frequency bands have different BSSIDs, the station device may identify whether the data is sent by the associated BSS more quickly, thus decreasing a power consumption of the station device for the data transmission in the multi-communication connection.

According to the technical solution of the embodiments of the disclosure, the message frame is received and the BSSIDs of the plurality of frequency bands are determined based on the message frame. In this way, the data transmitted in the multi-communication connection can be identified quickly, such that a power consumption of the station device may be saved, thus improving a throughout of the system and an effective utilization rate of the frequency spectrum when the device performs the communication under the plurality of frequency bands.

Figure 6:
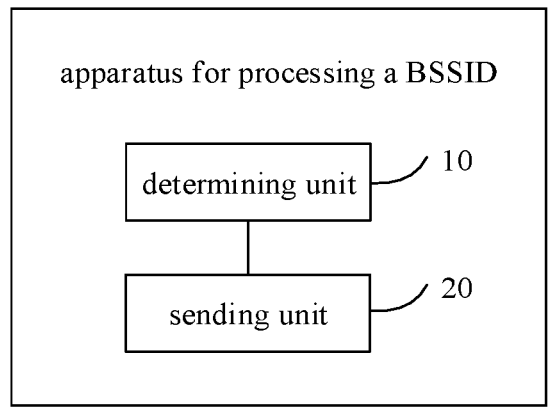
FIG. 6 is a first block diagram illustrating an apparatus for processing a BSSID according to an embodiment.

FIG. 6 is a first block diagram illustrating an apparatus for processing a BSSID according to an embodiment. The apparatus is applied at the AP side. As illustrated in FIG. 6, the apparatus includes a determining unit 10 and a sending unit 20.

The determining unit 10 is configured to generate a message frame, in which the message frame includes information bits for BSSIDs (such as BSS colors) under a plurality of frequency bands, and the plurality of frequency bands include a first frequency band for sending the message frame.

The sending unit 20 is configured to send the message frame using the first frequency band.

In some implementations, the determining unit 10 is configured to: carry a BSSID indicating the first frequency band in a first information bit of the information bits of the message frame; and carry a BSSID indicating a second frequency band in a second information bit of the information bits of the message frame. The second frequency band is a communication frequency band different from the first frequency band.

In some implementations, the determining unit 10 is configured to: set on a physical header of the message frame a BSSID that is the same as the BSSID indicating the first frequency band in the first information bit.

In some implementations, the determining unit 10 is configured to: carry an identification representing the second frequency band and the BSSID indicating the second frequency band in the second information bit.

In some implementations, the determining unit 10 is further configured to: carry duration information of the BSSID of each frequency band of the plurality of frequency bands in the message frame.

In some implementations, the determining unit 10 is further configured to: use a same BSSID by communication connections in a multi-communication connection in response to the multi-communication connection being a multi-communication connection within the first frequency band; and use respective BSSIDs suitable for communication frequency bands by the communication connections in the multi-communication connection in response to the multi-communication connection including a communication connection within the first frequency band and a communication connection within the second frequency band, in which different BSSIDs are used for different frequency bands.

In the above technical solution, the message frame is a beacon frame, a probe response frame, or an association response frame.

Regarding the apparatus in the above embodiment, the specific manner in which each module performing operations has been described in detail in the embodiments of the method, and detailed description will not be given here.

In the actual application, the specific structure of the above determining unit 10 and the sending unit 20 can be implemented by the apparatus for processing a BSSID or a central processing unit (CPU), a micro controller unit (MCU), a digital signal processing (DSP) or a programmable logic controller (PLC) in an AP device that the apparatus belongs to.

The apparatus for processing a BSSID described in the embodiment may be set at the AP side.

It should be understood that, the functions of processing modules in the apparatus for processing a BSSID described in the embodiment can be understood with reference to the related description of the above method for processing a BSSID applied at the AP device side. The processing modules in the apparatus for processing a BSSID described in the embodiment may be implemented by an analog circuit for implementing the functions described in the embodiment or by running a software of performing the functions described in the embodiment on the AP device.

The apparatus for processing a BSSID described in the embodiment may reduce a power consumption of the station device for data transmission in a multi-connection.

Figure 7:
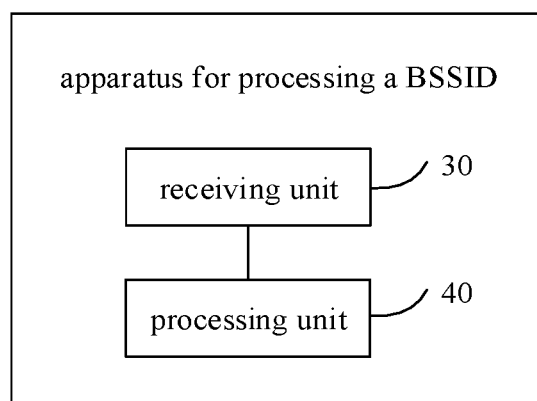
FIG. 7 is a second block diagram illustrating an apparatus for processing a BSSID according to an embodiment.

FIG. 7 is a first block diagram illustrating an apparatus for processing a BSSID according to an embodiment. The apparatus is applied at the AP side. As illustrated in FIG. 7, the apparatus includes a receiving unit 30 and a processing unit 40.

The receiving unit 30 is configured to receive a message frame.

The processing unit 40 is configured to determine BSSIDs for a plurality of frequency bands based on the message frame, in which the plurality of frequency bands includes a first frequency band for sending the message frame.

In some implementations, the processing unit 40 is further configured to: set BSSIDs respectively corresponding to frequency bands in a multi-communication connection on a physical header of a data frame sent through the multi-communication connection.

In some implementations, the processing unit 40 is further configured to: determine a duration of the BSSID of each frequency band based on the message frame, in response to the message frame carrying duration information of the BSSID of each frequency band of the plurality of frequency bands.

In some implementations, the processing unit 40 is further configured to: update the BSSID of each frequency band based on the duration of the BSSID of each frequency band.

In some implementations, the processing unit 40 is further configured to: use a same BSSID by communication connections in a multi-communication connection in response to the multi-communication connection being a multi-communication connection within the first frequency band; and use respective BSSIDs suitable for communication frequency bands by the communication connections in the multi-communication connection in response to the multi-communication connection including a communication connection within the first frequency band and a communication connection within the second frequency band, in which different BSSIDs are used for different frequency bands.

Regarding the apparatus in the above embodiment, the specific manner in which each module performing operations has been described in detail in the embodiments of the method, and detailed description will not be given here.

In the actual application, the specific structure of the above receiving unit 30 and the processing unit 40 can be implemented by the apparatus for processing a BSSID or a CPU, a MCU, a DSP or a PLC in a station device that the apparatus belongs to.

The apparatus for processing a BSSID described in the embodiment may be set at the station side.

It should be understood that, the functions of processing modules in the apparatus for processing a BSSID described in the embodiment can be understood with reference to the related description of the above method for processing a BSSID applied at the station side. The processing modules in the apparatus for processing a BSSID described in the embodiment may be implemented by an analog circuit for implementing the functions described in the embodiment or by running a software of performing the functions described in the embodiment on the station device.

The apparatus for processing a BSSID described in the embodiment may reduce a power consumption of the station device for data transmission in a multi-connection.

Figure 8:
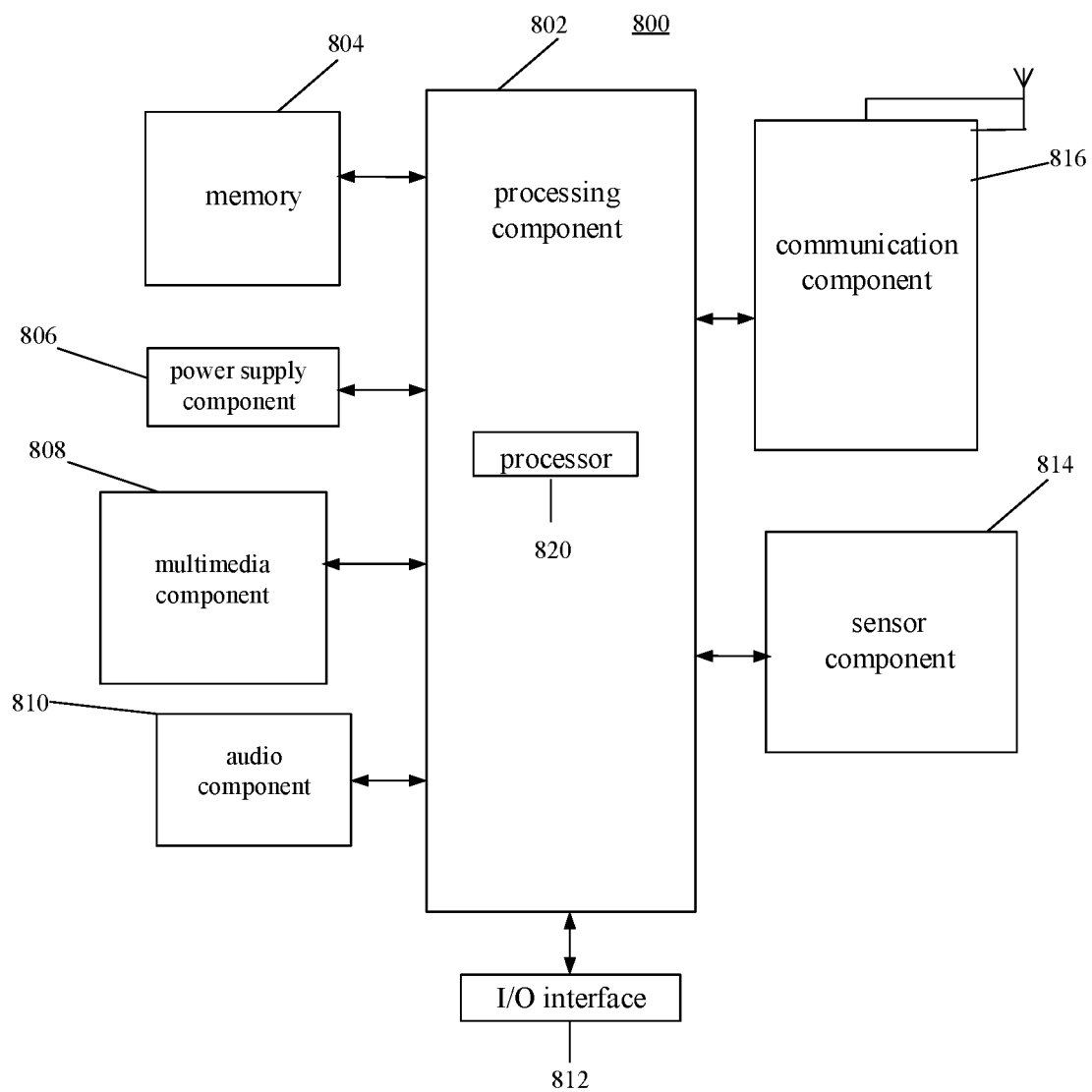
FIG. 8 is a first block diagram illustrating a device configured to implement processing a BS SID according to an embodiment.

FIG. 8 is a block diagram illustrating a device 800 configured to implement processing a BSSID according to an embodiment. For example, the device 800 may be a mobile phone, a computer, a digital broadcasting terminal, a messaging device, a game console, a tablet device, a medical equipment, a fitness equipment, a personal digital assistant, and so on.

Referring to FIG. 8, the device 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the device 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the device 800. Examples of the data include the instructions of any applications or methods operated on the device 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the device 800. The power supply component 806 may include a power supply management system, one or more power supplies, and other units related to generating, managing and distributing power for the device 800.

The multimedia component 808 includes an output interface screen provided between the device 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the device 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the device 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the device 800. For example, the sensor component 814 may detect the on/off state of the device 800 and the relative positioning of the component. For example, the component is a display and a keypad of the device 800. The sensor component 814 may further detect the location change of the device 800 or one component of the device 800, the presence or absence of contact between the user and the device 800, the orientation or acceleration/deceleration of the device 800, and the temperature change of the device 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the device 800 and other devices. The device 800 may access wireless networks based on communication standard, such as WiFi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the device 800 to complete the above methods. For example, the non-transitory computer-readable storage medium may be a ROM, a random access memory (RAM), a CD-ROM, a magnetic tape, a floppy disk, an optical data storage device, etc.

Figure 9:
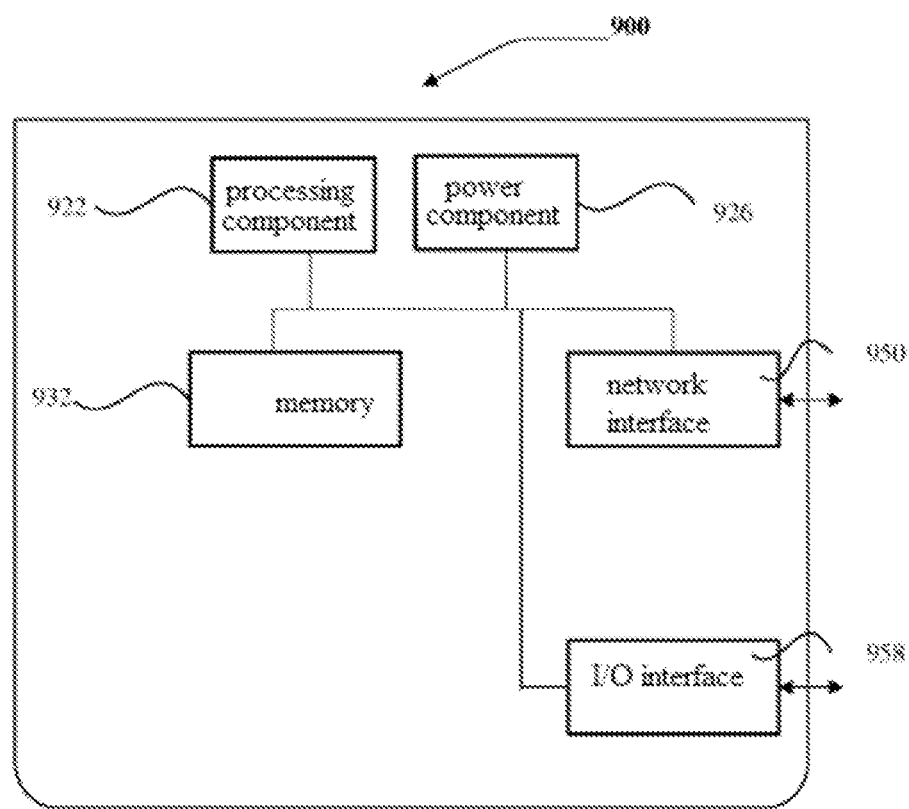
FIG. 9 is a second block diagram illustrating a device configured to implement processing a BSSID according to an embodiment.

FIG. 9 is a block diagram illustrating a device 900 configured to implement processing a BSSID according to an embodiment. For example, the device 900 may be provided as a network device. As illustrated in FIG. 9, the device 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform the above methods.

The device 900 may also include a power component 926 configured to perform power management of the device 900, a wired or wireless network interface 950 configured to connect the device 900 to a network, and an input output (I/O) interface 958. The device 900 can operate based on an operating system stored in the memory 932, such as Windows Server™, Mac OS X™, Unix™, Linux™, FreeBSD™ or the like.

The technical solutions recorded in the embodiments of the disclosure may be combined in any manner if there is no conflict.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

The invention claimed is:

1. A method for processing a basic service set identifier (BSSID), comprising:
    generating a message frame, wherein the message frame comprises information bits for BSSIDs under more than one frequency bands, and the more than one frequency bands comprise a first frequency band for sending the message frame;
    sending the message frame using the first frequency band;
    carrying a BSSID corresponding to the first frequency band in a first information bit of the information bits of the message frame; and
    carrying a BSSID corresponding to a second frequency band in a second information bit of the information bits of the message frame;
    wherein the second frequency band is a communication frequency band different from the first frequency band.

2. The method of claim 1, further comprising:
    setting, on a physical header of the message frame, a BSSID that is the same as the BSSID indicating the first frequency band in the first information bit.

3. The method of claim 1, wherein carrying the BSSID indicating the second frequency band in the second information bit of the information bits of the message frame comprises:
    carrying an identification representing the second frequency band and the BSSID indicating the second frequency band in the second information bit.

4. The method of claim 1, further comprising:
carrying duration information of the BSSID of each frequency band of the more than one frequency bands in the message frame.

5. The method of claim 1, further comprising:
using a same BSSID by communication connections in a multi-communication connection in response to the multi-communication connection being a multi-communication connection within the first frequency band; and
using respective BSSIDs suitable for communication frequency bands by the communication connections in the multi-communication connection in response to the multi-communication connection comprising a communication connection within the first frequency band and a communication connection within the second frequency band, wherein different BSSIDs are used for different frequency bands.

6. The method of claim 1, wherein the message frame is one of a beacon frame, a probe response frame, and an association response frame.

7. A method for processing a basic service set identifier (BSSID), comprising:
receiving a message frame; and
determining BSSIDs for more than one frequency bands based on the message frame, wherein the more than one frequency bands comprises a first frequency band for sending the message frame;
where the message frame comprises information bits for BSSIDs under more than one frequency bands by carrying a BSSID corresponding to the first frequency band in a first information bit of the information bits of the message frame and carrying a BSSID corresponding to a second frequency band in a second information bit of the information bits of the message frame; wherein the second frequency band is a communication frequency band different from the first frequency band.

8. The method of claim 7, further comprising:
setting BSSIDs respectively corresponding to frequency bands in a multi-communication connection on a physical header of a data frame sent through the multi-communication connection.

9. The method of claim 7, further comprising:
determining a duration of the BSSID of each frequency band based on the message frame, in response to the message frame carrying duration information of the BSSID of each frequency band of the more than one frequency bands.

10. The method of claim 9, further comprising:
updating the BSSID of each frequency band based on the duration of the BSSID of each frequency band.

11. The method of claim 7, further comprising:
using a same BSSID by communication connections in a multi-communication connection in response to the multi-communication connection being a multi-communication connection within the first frequency band; and
using respective BSSIDs suitable for communication frequency bands by the communication connections in the multi-communication connection in response to the multi-communication connection comprising a communication connection within the first frequency band and a communication connection within the second frequency band, wherein different BSSIDs are used for different frequency bands.

12. A device for processing a basic service set identifier (BSSID), comprising:
a processor;
a memory storing instructions executable by the processor;
wherein, the processor is configured to perform the method for processing a basic service set identifier (BSSID) according to claim 7.

13. A device for processing a basic service set identifier (BSSID), comprising:
a processor;
a memory storing instructions executable by the processor;
wherein, the processor is configured to perform a method for processing a basic service set identifier (BSSID), comprising:
generating a message frame, wherein the message frame comprises information bits for BSSIDs under more than one frequency bands, and the more than one frequency bands comprise a first frequency band for sending the message frame;
sending the message frame using the first frequency band;
carrying a BSSID corresponding to the first frequency band in a first information bit of the information bits of the message frame; and
carrying a BSSID corresponding to a second frequency band in a second information bit of the information bits of the message frame;
wherein the second frequency band is a communication frequency band different from the first frequency band.

14. The device of claim 13, wherein the processor is further configured to perform:
setting, on a physical header of the message frame, a BSSID that is the same as the BSSID indicating the first frequency band in the first information bit.

15. The device of claim 13, wherein carrying the BSSID indicating the second frequency band in the second information bit of the information bits of the message frame comprises:
carrying an identification representing the second frequency band and the BSSID indicating the second frequency band in the second information bit.

16. The device of claim 13, wherein the processor is further configured to perform:
carrying duration information of the BSSID of each frequency band of the more than one frequency bands in the message frame.

17. The device of claim 13, wherein the processor is further configured to perform:
using a same BSSID by communication connections in a multi-communication connection in response to the multi-communication connection being a multi-communication connection within the first frequency band; and
using respective BSSIDs suitable for communication frequency bands by the communication connections in the multi-communication connection in response to the multi-communication connection comprising a communication connection within the first frequency band and a communication connection within the second frequency band, wherein different BSSIDs are used for different frequency bands.

18. The device of claim 13, wherein the message frame is one of a beacon frame, a probe response frame, and an association response frame.

* * * * *